UNITED STATES PATENT OFFICE.

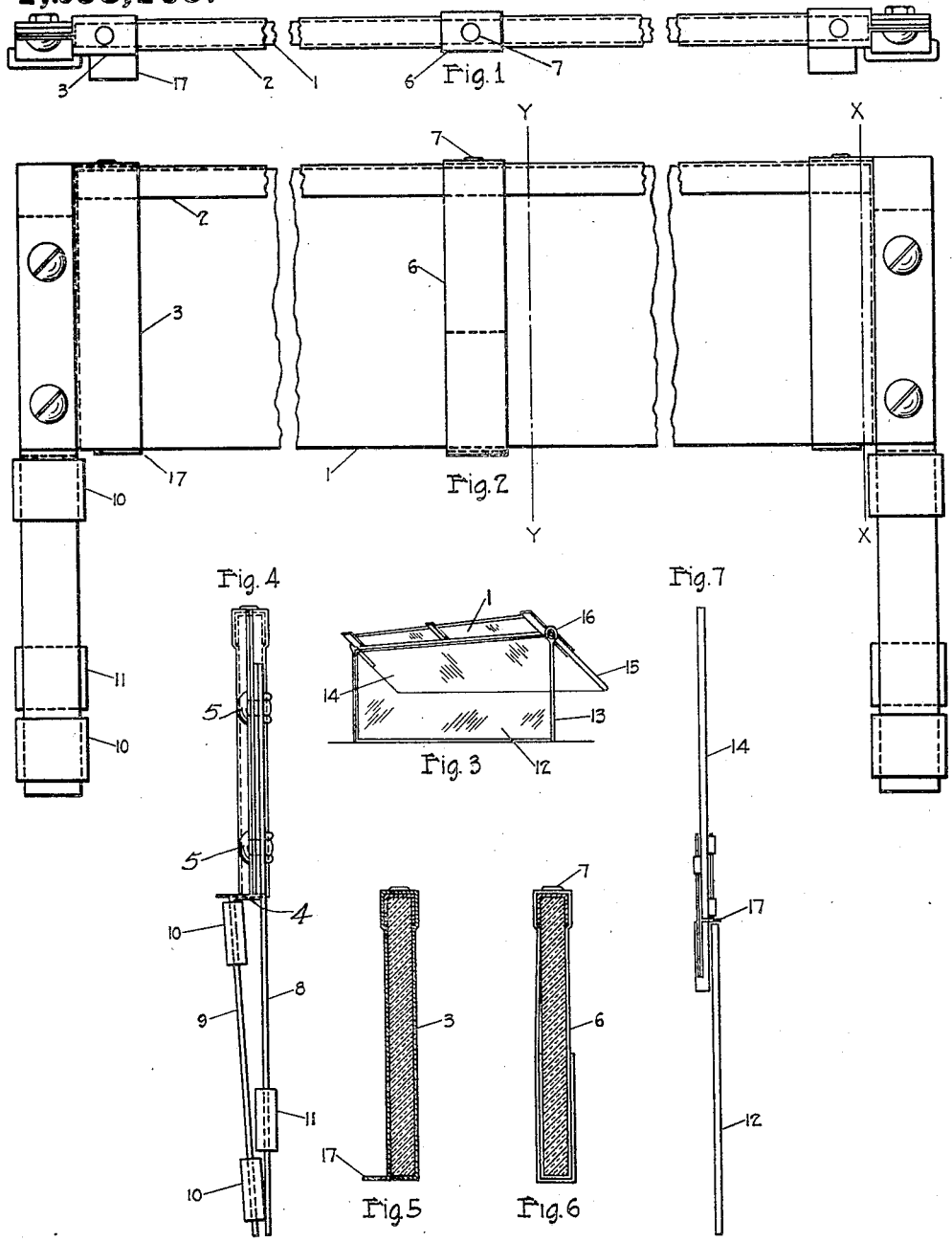

EDWARD B. STINSON, JR., OF LOUISVILLE, KENTUCKY.

WIND-SHIELD ATTACHMENT.

1,258,163.  Specification of Letters Patent.  Patented Mar. 5, 1918.

Application filed July 24, 1917. Serial No. 182,547.

*To all whom it may concern:*

Be it known that I, EDWARD B. STINSON, Jr., residing at Louisville, in the county of Jefferson and State of Kentucky, a citizen of the United States, have invented a new and useful Improvement in Wind-Shield Attachments, of which the following is a specification.

My improvement relates to attachments for wind shields of a type commonly used in automobiles, such wind shields ordinarily consisting of a fixed glass plate, supported in a vertical position by a suitable metal frame, to which frame is hinged another frame or metal support carrying another glass plate, the relationship of the parts of the said structure being such that the movable glass plate may when desired be moved to a substantially vertical position, or be made to assume a position such that it will present substantially no surface to the wind pressure created by the forward movement of the automobile, by reason of its being bent down to a position behind the stationary portion. The object of my invention is to provide an attachment for this type of windshield, which will, when the movable part of the windshield is in an appropriate position, have the effect of deflecting a current of air into the space just behind and below the windshield. This is the space ordinarily occupied by a driver of a machine and any one who may be seated by his side. The proximity of the space to the engine often renders it uncomfortably hot, so that it is desirable that a strong current of air under such conditions be employed to keep up the circulation.

In the accompanying drawing, Figure 1 is a top view of the attachment, shown broken at two places, the supplementary glass plate later referred to being indicated by dotted lines. Fig. 2 is an elevation of the attachment, shown broken, for compactness in the drawing. Fig. 3 is a perspective view, showing the attachment in place on a windshield, which is adjusted to the position in which the attachment would cause the desired deflection of wind. Fig. 4 is an end view of the attachment, Fig. 5 a cross-section at X X as indicated on Fig. 2, Fig. 6 a cross-section at Y Y as indicated on Fig. 2, Fig. 7 an end view of a windshield with the attachment in place, the hinge being omitted, so as to show the parts behind it.

Similar numbers refer to similar parts throughout the several views.

The attachment is made up principally of a supplementary glass plate 1, which is held or carried by a frame composed of a back piece 2 of U-section, and socket pieces 3 at the end. These socket pieces 3 are preferably made of thin metal and have shoulders, or offsets 4 which make sockets for the ends of the supplementary plate 1 and are bolted together as shown at 5.

The said socket pieces 3 overlie the back piece 2 and are fixed thereto, the glass plate 1 being held in the two sockets at the ends, and the channel of the back piece. In the form shown a strap 6 is provided at or near the center of the glass plate 1, attached to the back piece 2 by the rivet 7, and adapted to bind the back piece 2 and the glass plate 1 close together. Fig. 6 shows the manner in which the strap is attached to the back piece and passes around the supplementary plate. At each end of the frame which is composed of the back piece 2 and the end socket pieces 3, clamps are provided, bolted to the end socket pieces 3, and extending out in the general direction parallel to the plane surfaces of the supplementary plate 1, and perpendicular to the longer edges thereof. The said clamp, as illustrated in Fig. 4, consists of two pieces of spring material such as steel, one of them 8, being a flat strip, the other 9 having a double bend or shoulder therein, and being so formed that when the straight portion of the said two spring strips are bolted or riveted to the socket pieces, the free ends of the two strips 8 and 9 closely approximate each other, but are so formed that they may be slipped over a glass plate such as the glass in the movable portion of the type of windshield above referred to, and will firmly grip or hold the same, furnishing a removable attachment thereto. To make this grip more certain and to avoid slipping, two pads 10 or cushion rings of resilient material, such as rubber tubing, are slipped over one of the arms of the clamp and one similar pad or cushion 11 over the other arm.

Reference to Fig. 3 will show the manner in which the attachment is employed. The fixed plate 12 is held by the frame 13 and the movable plate 14 of the windshield has suitable supports 15 which are hinged at 16 so as to permit the moving of said movable plate 14 to the desired angular position. It may be moved to a position substantially vertical above the fixed plate 12 in which position it affords to the persons occupying the seat behind it, a maximum of protection. As ordinarily constructed, the upper or movable plate 14, when in a vertical position, is not immediately over the fixed plate 12, but the hinge 16 is so arranged that the movable plate 14 is a short distance in front of, that is, farther away from the driving seat than, the fixed plate 12, as is made evident in Fig. 7.

When the protection of the movable plate 14 is not required, it may be folded down to a position such as that shown in Fig. 3, behind the fixed plate. Applicant's attachment is designed and adapted to form a continuation of the top or movable plate 14, held in place by the clamps before described. When the top of the movable plate 14 is folded down at such an angle as is shown in Fig. 3, applicant's attachment, extending above the fixed plate 12, and in the position of a continuation of the movable plate 14, acts as a wind deflector. The wind is first caught by the surface of the attachment, is directed through the clearance space between the fixed plate 12 and the movable plate 14, and further guided by the surface of the movable plate 14 so that it is directed where needed toward the bottom of the car.

When the movable plate 14 is moved up to the position shown in Fig. 7, so as to give protection from the wind, the applicant's attachment, moving with the movable plate 14, assumes the position shown in Fig. 7, and, since the supplementary plate 1 is made of transparent material, it does not substantially interfere with the view of the operator of the machine. Projections 17 are provided on the socket pieces, extending out perpendicular to the plane of the supplementary plate, as shown especially in Figs. 1 and 7. These projections 17, when the movable plate 14 is in position shown in Fig. 7, do away with any danger that the attachment might, with the vibration of the automobile, slip and fall, the said projections tending, in the event of such slipping, to bear against the top of fixed glass plate 12, and prevent the falling off of the attachment.

I claim as new and desire to protect by Letters Patent the following:

1. In a wind deflecting attachment for windshields having a transparent plate adjustable at varying angles to the vertical, a supplementary plate, and means for detachably attaching same to the adjustable transparent plate first above mentioned.

2. In a wind deflecting attachment for windshields having a transparent plate adjustable at varying angles to the vertical, a supplementary plate, and means for detachably attaching same to the adjustable transparent plate first above mentioned in such a position relative thereto that it acts as a continuation of said transparent plate.

3. In a wind deflecting attachment having an upper plate so mounted as to be movable with reference to a lower plate, a supplementary plate of transparent material, and means for detachably attaching same to the upper plate just referred to, edge to edge.

4. In a wind deflecting attachment for windshields having a transparent plate adjustable at varying angles to the vertical, the combination of a supplementary plate of transparent material, a back piece, and end socket pieces, forming a frame in which said plate is held, in further combination with clamps attached to said frame and of a shape adapted to removably attach said frame to said first named plate.

5. In a wind deflecting attachment for windshields having a transparent plate adjustable at varying angles to the vertical, a supplementary plate of transparent material, a back piece, and end socket pieces, forming a frame in which said plate is held, in combination with a clamp at each end of said frame, each clamp being composed of two members of spring material, so attached to said frame that they extend out in a general direction parallel to the plane surfaces of said supplementary plate.

6. In a wind deflecting attachment for windshields having a transparent plate adjustable at varying angles to the vertical, a supplementary plate of transparent material, a back piece, and end socket pieces, forming a frame in which said plate is held, in combination with a clamp at each end of said frame, each clamp being composed of two members of spring material, so attached to said frame that they extend out in a general direction parallel to the plain surfaces of said supplementary plate, and cushions on said members of spring material, substantially as described.

7. In a wind deflecting attachment for windshields having a transparent plate adjustable at varying angles to the vertical, a supplementary plate of transparent material, a back piece, and end socket pieces, forming a frame in which said plate is held, said frame being provided with projections thereon extending out perpendicular to the plane surface of said supplementary plate.

8. In a wind deflecting attachment for windshields having a transparent plate adjustable at varying angles to the vertical, and a fixed transparent plate below said adjustable plate, the combination of a supplementary plate with means for attaching same to said adjustable plate, edge to edge in such position with reference to said adjustable plate that when said adjustable plate is turned down so that its edge to which the supplementary plate is attached is uppermost, the supplementary plate extends above the uppermost edge of the fixed plate.

EDWARD B. STINSON, Jr.

Witnesses:
  Roy B. Hansbrough,
  Charles W. Milner.

Copies of this patent may be obtained for five cents each, by addressing the "Commissioner of Patents, Washington, D. C."